(No Model.)
9 Sheets—Sheet 1.

J. B. MILLER.
BUTTON SETTING MACHINE.

No. 355,832. Patented Jan. 11, 1887.

WITNESSES:
N. S. Armstutz
Geo. W. King

J. B. Miller. INVENTOR

BY Leggett & Leggett

ATTORNEYS (No Model.)

9 Sheets—Sheet 2.

J. B. MILLER.
BUTTON SETTING MACHINE.

No. 355,832. Patented Jan. 11, 1887.

WITNESSES:
N. S. Amstutz
Geo. W. King

J. B. Miller  INVENTOR

BY Leggett & Leggett
ATTORNEYS (No Model.)

J. B. MILLER.
BUTTON SETTING MACHINE.

No. 355,832. Patented Jan. 11, 1887.

9 Sheets—Sheet 3.

WITNESSES:

J. B. Miller, INVENTOR

BY Liggett & Liggett

ATTORNEYS (No Model.) 9 Sheets—Sheet 4.
J. B. MILLER.
BUTTON SETTING MACHINE.
No. 355,832. Patented Jan. 11, 1887.
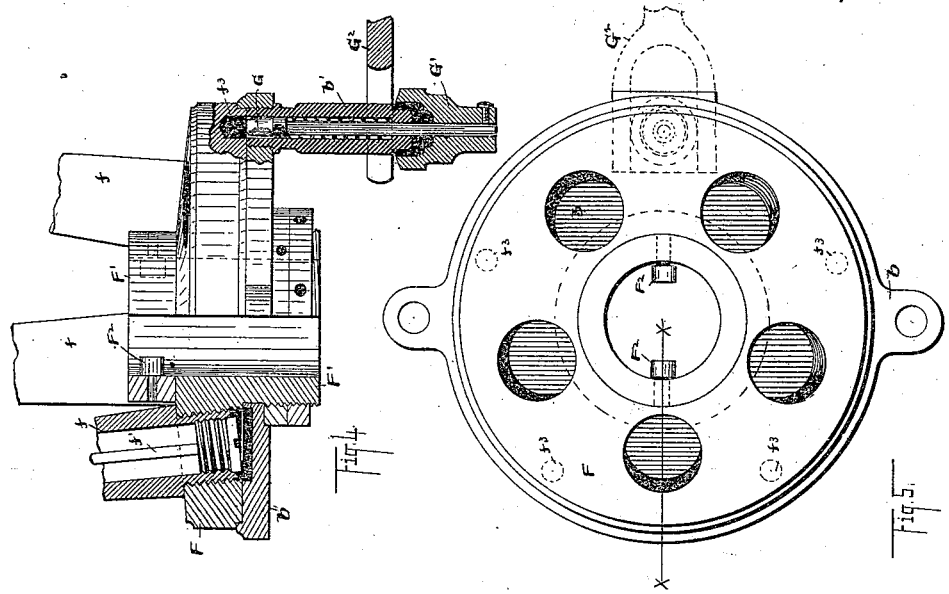
INVENTOR
J. B. Miller,
BY Liggett & Liggett
ATTORNEYS (No Model.) 9 Sheets—Sheet 5.
J. B. MILLER.
BUTTON SETTING MACHINE.
No. 355,832. Patented Jan. 11, 1887.
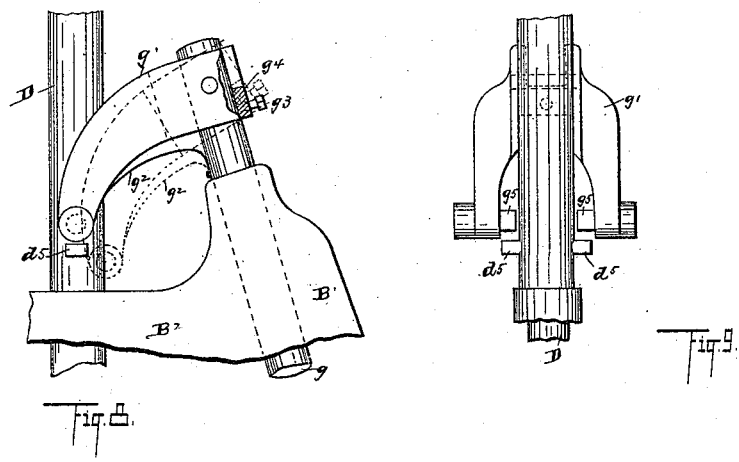
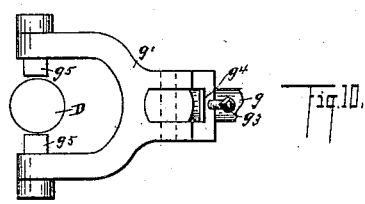
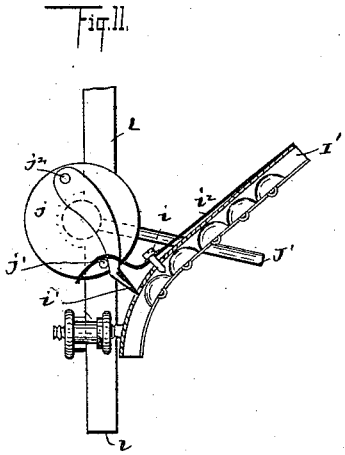
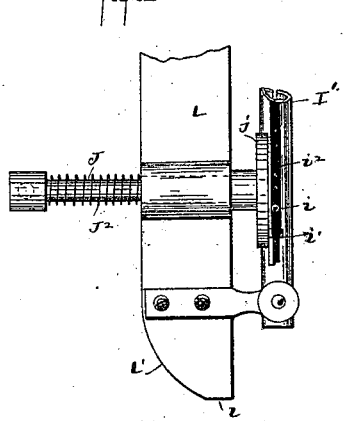
WITNESSES: J.B.Miller, INVENTOR
BY Seggett & Seggett
ATTORNEYS (No Model.)　　　　　　　　　　　　　　　　　9 Sheets—Sheet 6.
J. B. MILLER.
BUTTON SETTING MACHINE.
No. 355,832.　　　　　　　　　　　Patented Jan. 11, 1887.
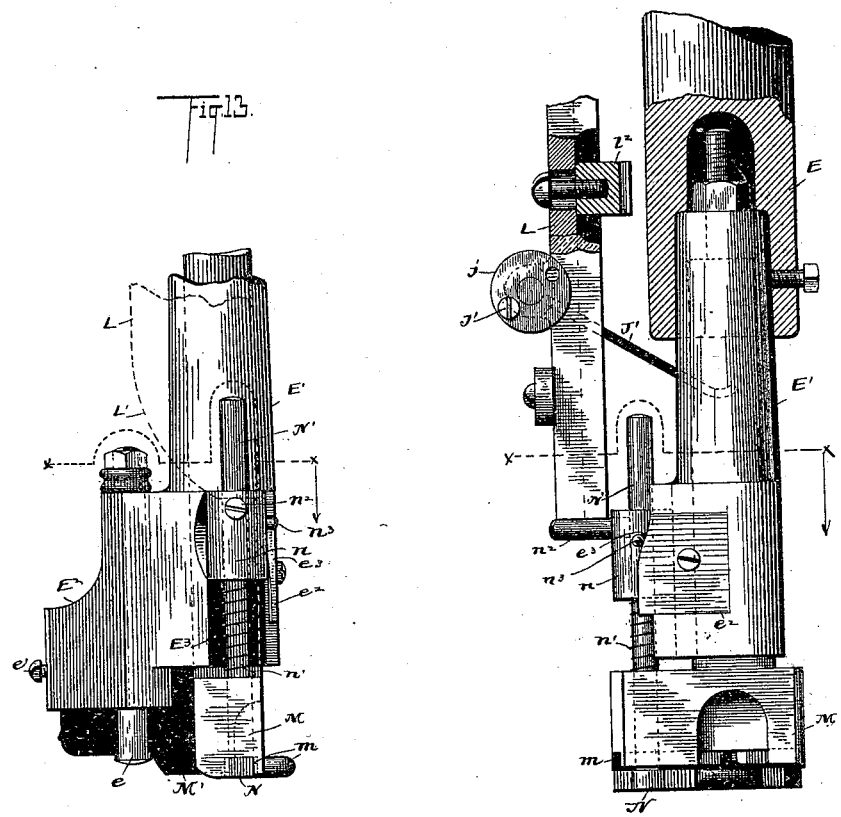
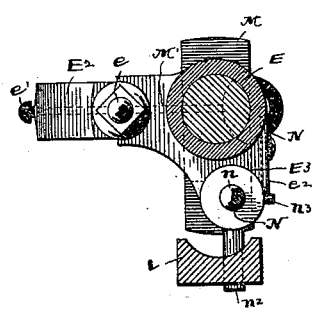

(No Model.) 9 Sheets—Sheet 7.
J. B. MILLER.
BUTTON SETTING MACHINE.
No. 355,832. Patented Jan. 11, 1887.
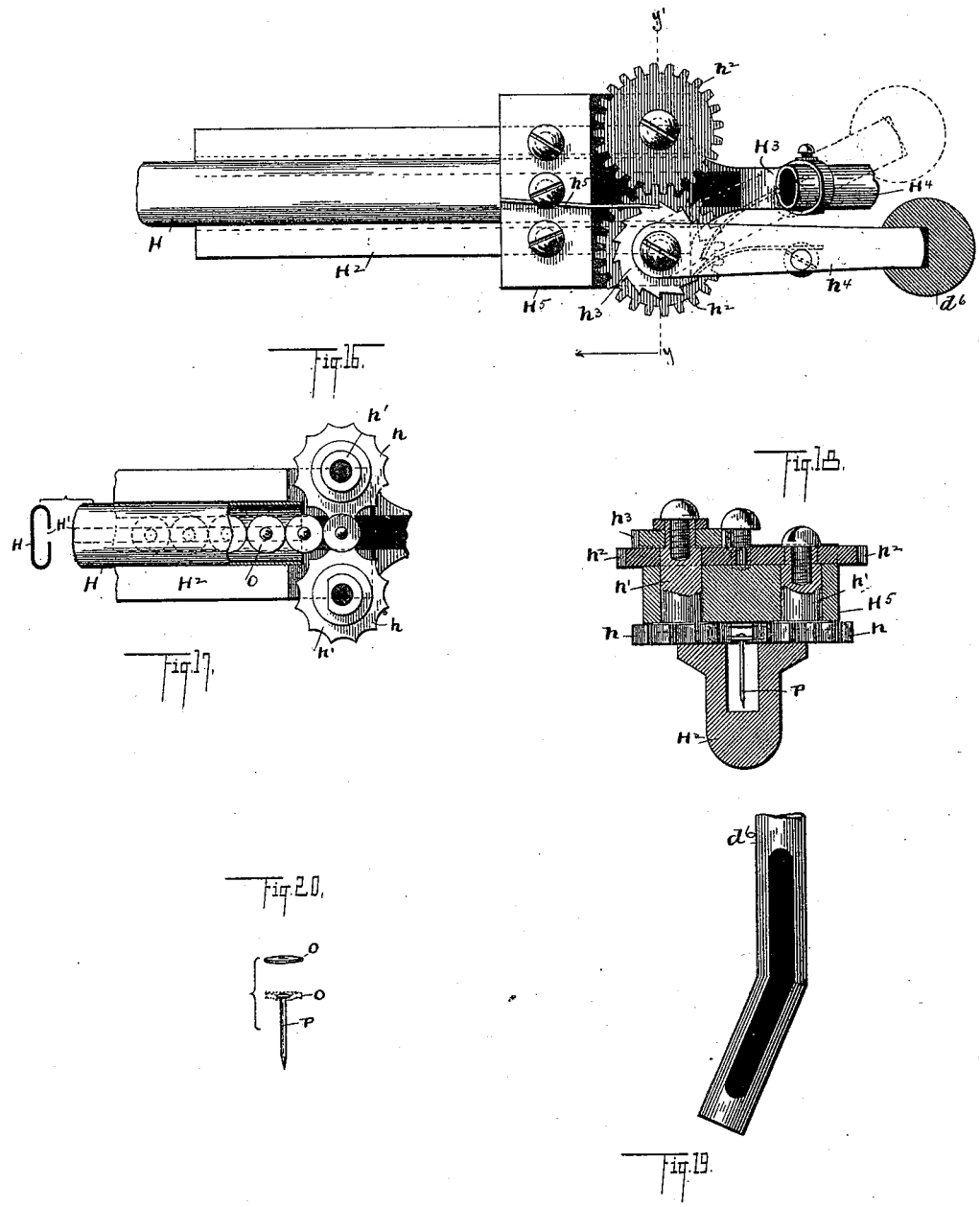

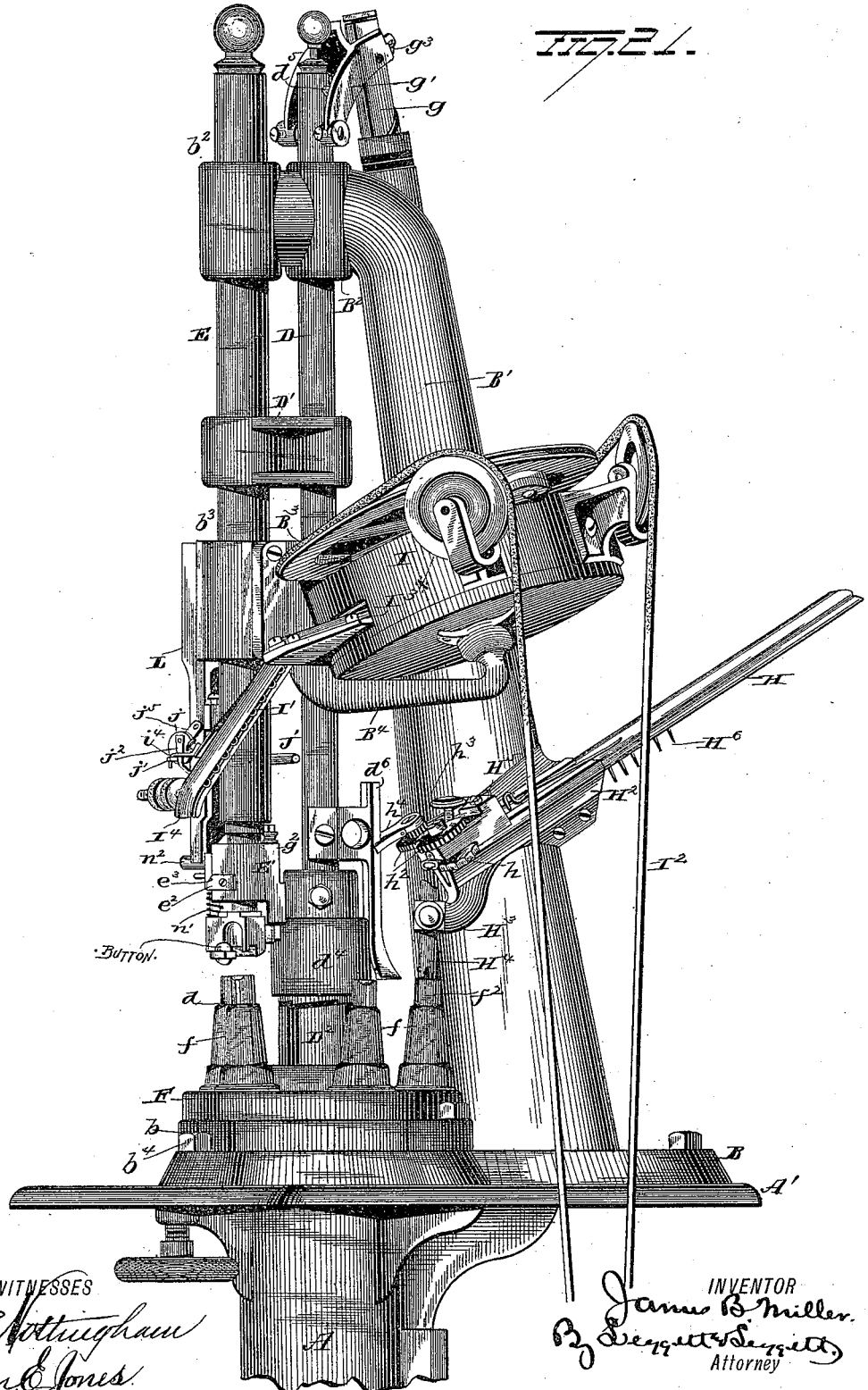

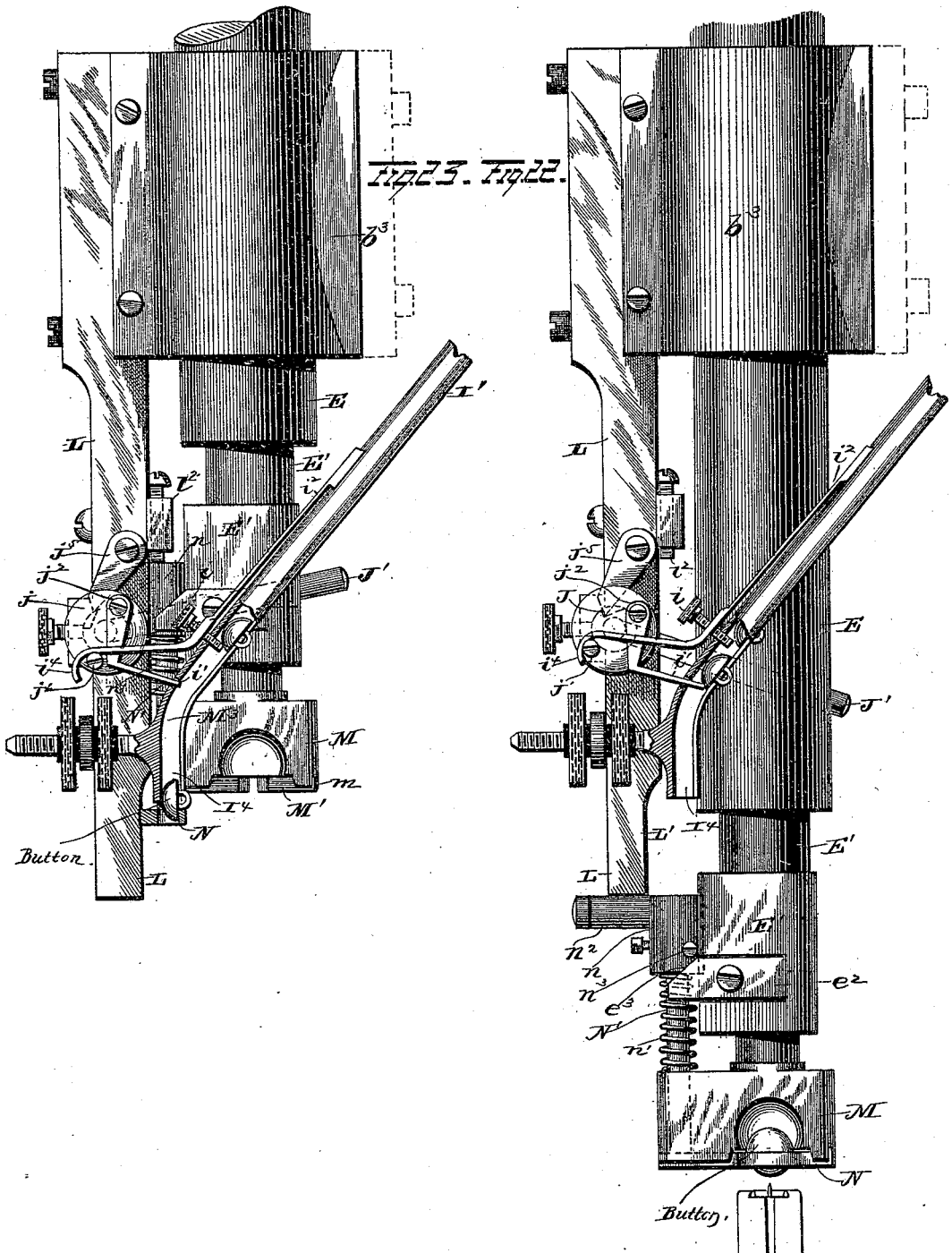

UNITED STATES PATENT OFFICE.

JAMES B. MILLER, OF KENT, OHIO.

BUTTON-SETTING MACHINE.

SPECIFICATION forming part of Letters Patent No. 355,832, dated January 11, 1887.

Application filed July 21, 1886. Serial No. 208,620. (No model.)

*To all whom it may concern:*

Be it known that I, JAMES B. MILLER, of Kent, in the county of Portage and State of Ohio, have invented certain new and useful Improvements in Button-Setting Machines; and I do hereby declare the following to be a full, clear, and exact description of the invention, such as will enable others skilled in the art to which it pertains to make and use the same.

My invention relates to improvements in button-setting machines in which are employed various devices heretofore used in hand and treadle machines together with new auxiliary and connecting mechanism and certain improvements, the object being to provide an automatic power-machine.

With this object in view my invention consists in certain features of construction and in combination of parts, hereinafter described, and pointed out in the claims.

Figure 1:
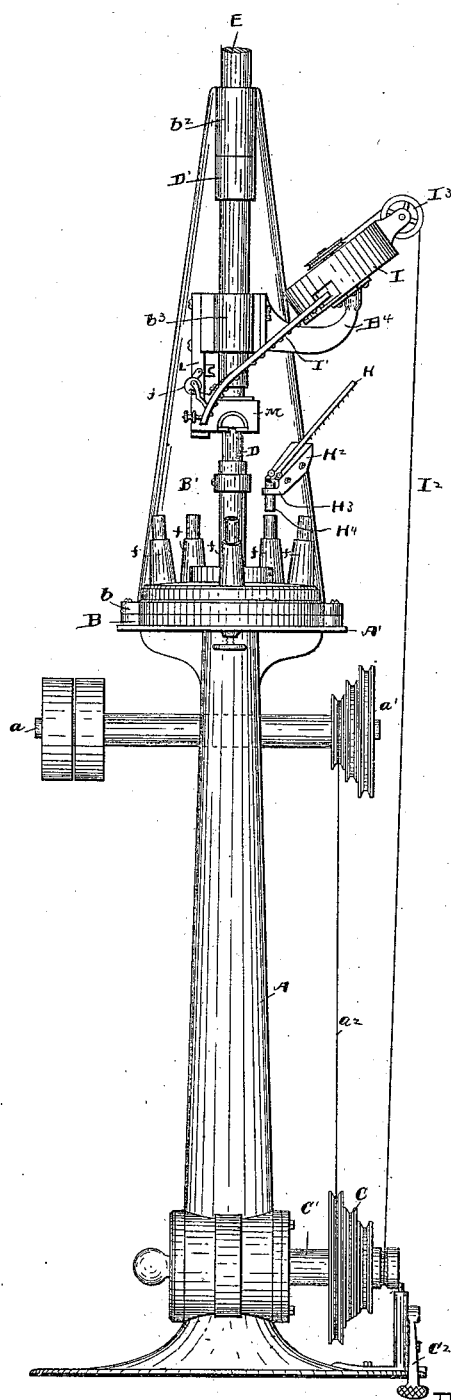
Figure 2:
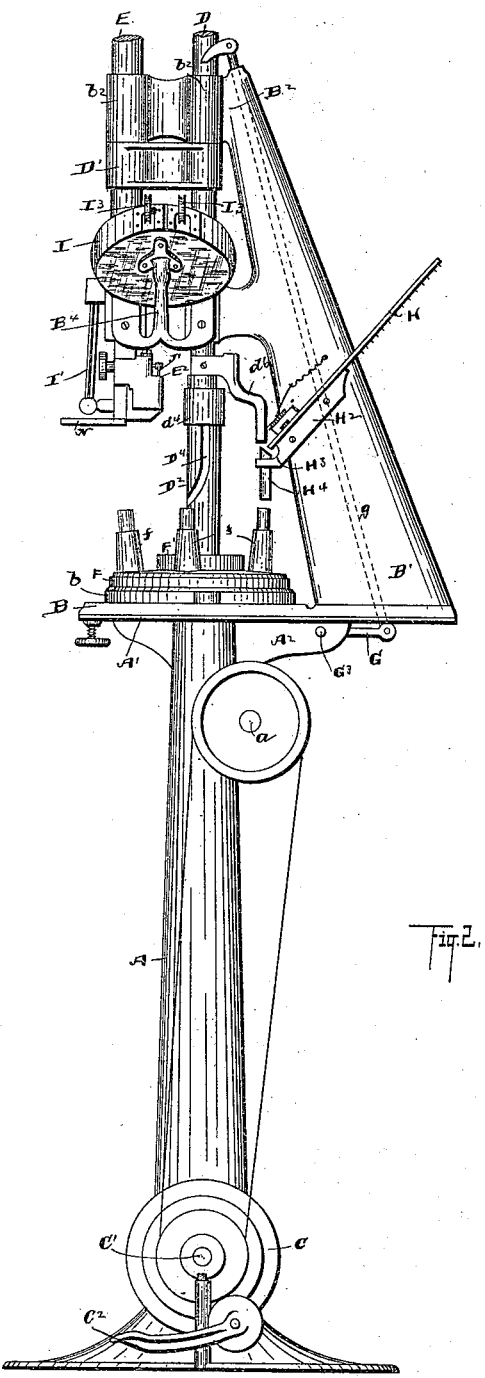
Figure 3:
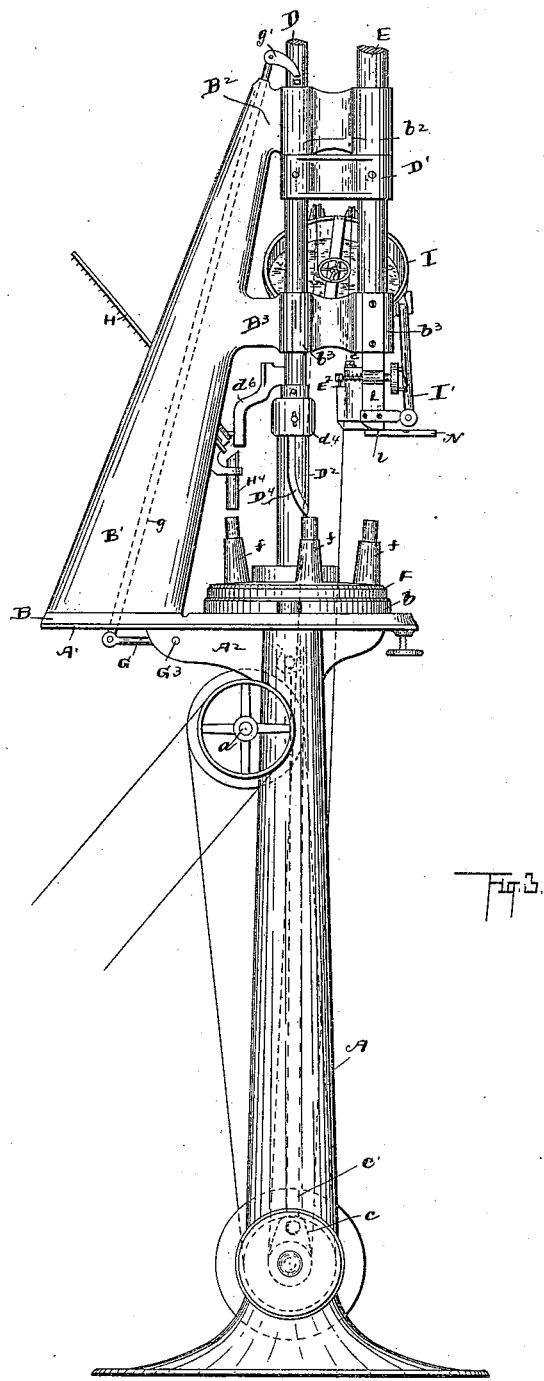

In the accompanying drawings, Figures 1, 2, and 3 are elevations, respectively, of the front, right, and left hand sides of the machine embodying my invention. Fig. 4 is an elevation, partly in section, of the disk F and the plate $b$ and their respective attachments. Fig. 5 is a plan view of the disk. Fig. 6 is an elevation of the sleeve $D^2$ and attachments, the latter being partly in section. Fig. 7 is an elevation in section of a plug, $f$, and attachments. Figs. 8, 9, and 10 are respectively a side and front elevation and plan of the tilting toe $g'$ and adjacent parts. Figs. 11 and 12 are respectively front and side elevations of the button-feeding device. Figs. 13 and 14 are elevations, respectively, of the side and front of the clinching mechanism. Fig. 15 is a plan in section taken on the line $x\ x$, Fig. 13. Fig. 16 is a plan of the fastener-feeding device. Fig. 17 is a plan of the fluted feeding disks or rolls. Fig. 18 is an elevation partly in section, the sectional parts being on the line $y\ y$, Fig. 16. Fig. 19 is a side elevation of a depending slotted arm, $d^6$. Fig. 20 shows a washer and pin forming a fastener. Fig. 21 is a view in perspective of the upper portion of the machine. Fig. 22 is a view in side elevation, partly in section, showing the mechanism for feeding the buttons; and Fig. 23 is a similar view showing the parts in different positions.

A represents a hollow supporting-column having a broad base, and being provided above with a horizontal flange, A', that supports the bed B. The bed and flange correspond in plan. The bed is usually cast integral with the hollow inclined standard B', from which latter project laterally over the bed and in the same vertical plane the arms $B^2$ and $B^3$, these arms being provided, respectively, with thimbles $b^2$ and $b^3$, that form ways for the reciprocating plungers D and E. The said plungers are connected rigidly by the yoke D', and hence are made to move in unison.

On the rear side of the column, and journaled in suitable boxes connected therewith, is located the driving-shaft $a$, the same having a driving and loose pulley mounted on one end, as shown, and on the other end having a cone, $a'$, from which leads a belt, $a^2$, to the cone C, the latter being mounted loose on the shaft C'. A clutch, (not shown, but of ordinary construction,) is mounted on the shaft C', inside the cone C, with a treadle, $C^2$, for operating the clutch, by means of which the shaft is made to revolve with the cone, or is stopped at the pleasure of the operator, as may be necessary in operating the machine. The shaft C' is journaled in suitable boxes connected with the column, and inside the latter has attached a crank, $c$, with a pitman, $c'$, connecting the crank with the lower end of the plunger D. (See dotted lines, Fig. 3.)

The bed B is re-enforced on top by a detachable plate, $b$, the latter being secured to the bed by bolts or screws, the said plate forming a seat for the intermittently-revolving disk F. The disk has a hollow hub, F', the depending end of which fits easily in the central bore of the plate $b$, with jam-nuts on the hub below the plate to hold the disk down to its seat. (See Fig. 4.) The disk is provided with a series of hollow plugs, $f$, projecting upward, the number of which is not essential. These plugs are set at equal intervals on a line concentric with the axis of the disk. These plugs contain, respectively, an anvil, $f'$, and a depressible spring-actuated sleeve, $f^2$, for holding the button-fastener, and co-operating with the clinching mechanism, acting from above. The plugs and attachments are substantially the same as described in United States Letters Patent No. 312,688, issued February 24, 1885, to A. G. Wilkins and J. B. Miller. The sleeves $f^2$ in turn receive fasteners from the tube $H^3$, and carry the same under the clinching mechanism, to accomplish which, by intermittently revolving the disk, I have devised the following: The plunger D has a sleeve, $D^2$, journaled thereon, the latter fitting easily in the bore of the hub $F'$ of the disk F. The plunger is provided with suitable collars, as shown, respectively above and below the sleeve, to hold the latter endwise. The upper end of the sleeve is provided with ratchet-teeth $D^3$, and a collar, $d$, having corresponding teeth, is mounted on the plunger, and is held down to its engagement with the sleeve by the action of the spring $d'$, and is held from turning on the plunger by one or more pins, $d^2$, that are secured to the collar and extend laterally through slots $d^3$ of the depending rim of the collar $d^4$. By this arrangement the ratchet-collar holds the sleeve $D^2$ from turning in one direction, and is snubbed back when the sleeve is turned in the opposite direction.

The hub $F'$ is provided with pins $F^2$, projecting internally and engaging grooves $D^4$ of the sleeve $D^2$. These grooves for some distance from the respective ends of the sleeve run vertically, but midway extend spirally, as shown, having a lead sufficient to revolve the disk the distance from center to center of the plug $f$. With the downstroke of the plunger, the disk being locked, the sleeve revolves, snubbing back the ratchet-collar $d$. With the upstroke of the plunger, the disk being unlocked, and the sleeve being held by the ratchet-collar from turning, the disk is revolved, carrying one plug $f$, laden with a fastener, toward or to a position under the clinching mechanism, (according to the number of plugs and the arrangement of parts,) and bringing the next succeeding plug under the tube $H^4$ in position to receive a fastener.

It will be observed that the intermittent movement of the disk F occurs only during a portion of the upstroke of the plunger. There is, therefore, ample time given for other portions of the machine to perform their respective functions while the disk is at rest. For locking the disk F, the latter is provided on the under face with a series of holes, $f^3$, corresponding in number with the plugs $f$, and usually located midway of the plugs. The plate $b$ has a depending sleeve, $b'$, that extends down through suitable holes or openings made in the bed B and the flange $A'$. In this sleeve operates a spring-actuated dog, G, of ordinary construction, the tension of the spring pressing the dog upward, and the upper end of the dog being adapted to enter the holes $f^3$ when such holes register with the dog. The lower end of the dog is provided with a collar, $G'$, the upper face of which is engaged by the forked end of the lever $G^2$. This lever is pivoted at $G^3$, the pivotal pin passing through ribs $A^2$ of the column, between which ribs the lever is located. The outer end of the lever is connected with the rod $g$. The latter passes up inside the standard $B'$, and above the standard has pivoted thereto a tilting bifurcated toe, $g'$, the prongs of which latter are in position astride the plunger D. The toe is held in position distended from the rod $g$, as shown in solid lines, Fig. 8, by a spring, $g^2$, the distention of the toe being limited by an abutment-screw, $g^3$, that screws through a threaded hole in the cross-bar $g^4$, the latter being located at the rear lower corner of the toe, and the screw abutting the rod $g$ from the rear side. By turning this screw the toe is accurately adjusted and brought to the desired position, approximately, as shown in solid lines Fig. 8. The prongs of the toe are provided with pins $g^5$, set in line, and projecting inward toward the plunger, and the latter is provided with a pin, $d^5$, that projects on either side in the same vertical plane with the pins $g^5$ when the toe is in its normal position with the rod $g$ depressed. With the downward stroke of the plunger the pin $d^5$ strikes on top of the pin $g^5$, and the toe is tilted or snubbed back to the position shown in dotted lines, Fig. 8, the springs $g^2$ returning the toe to its normal position as soon as the pin $d^5$ has passed. With the upstroke of the plunger the pin $d^5$ strikes the under side of the pins $g^5$, and elevates the toe and rod $g$, thereby tilting the lever $G^2$ and undogging the disk, and this occurs just in advance of the turning of the disk by means aforesaid. By reason of the rod $g$ being inclined to the line of the plunger D when the former is elevated a short distance, the pins $g^5$ are thrust forward and off of the pin $d^5$, when the rod descends by gravity and the dog is pressed upward by its spring and slides along the under face of the disk until the next hole $f^3$ registers with the dog, when the disk is again locked by the dog.

The fasteners, consisting of washers O and pins P, assembled, as shown in Fig. 20, are "strung" in tubes H, either by hand or by machine, as the case may be, the pins extending out through a slot, $H'$, made in the under side of the tube. These tubes, filled with fasteners, are one at a time set with the discharging ends thereof extending into a suitable recess for receiving the same made in the outer end of the block $H^2$. The latter is secured to the standard $B'$ in position to hold the tube H inclined, so that the fasteners will slide down the tube by gravity. The inner end of the block $H^2$ terminates in a goose-neck and thimble, $H^3$, for supporting the short vertical tube $H^4$, that conducts the fastener to the sleeve $f^2$, the latter in turn being halted below the tube. This manner of supplying fasteners through tubes arranged substantially as shown is old. Heretofore slides were alternately thrust laterally into and drawn out of the tube to separate and discharge the fasteners. The trouble with such construction was that the fasteners, being slight and of mere nominal weight, were liable to be displaced by the slides and the washers made to tilt edgewise and overlap each other. I have therefore devised the following: A second block, $H^5$, is secured on top of the block H², and cut away on the under side near the inner end, leaving room for the feeding-disks $h$ between the two blocks. These disks or rollers have fluted edges, the flutings being set opposite each other, and, as the disks are turned, embrace a washer of the fastener and feed it to the spout H⁴. These disks are mounted on spindles $h'$, that extend up through suitable holes made in the block H⁵, and above the block the thimbles are provided with engaging twin gears $h^2$. On one of the spindles and above the gear is mounted a ratchet-wheel, $h^3$, the teeth of which correspond in number with the flutings on each feed-roll. Above the ratchet-wheel a lever, $h^4$, is pivoted on the spindle, said lever having a spring-pawl attached for engaging the ratchet-wheel, the latter also being provided with a spring-retaining pawl, $h^5$. The plunger D has attached an arm, $d^6$, the depending end of which is provided with an inclined edge that receives the end of the lever $h^4$, by means of which, with each reciprocation of the plunger, the ratchet-wheel is turned one notch, thereby turning the feed-disks and discharging the fastener into the tube H⁴. The pin of the fastener in falling strikes the edge of the tube H⁴, by means of which the fastener is inverted and the head of the pin falls upon the anvil and the washer rests on a seat made in the upper end of the sleeve $f^2$.

The container I, into which the buttons are placed in quantity, is supported by a bracket, B⁴, connected with the arm B³. The buttons are fed from the container into the inclined slotted tube I', by means of a revolving disk, (not shown,) the device being substantially the same as that described by Wilkins and Bartlett in Patent No. 330,951 of November 24, 1885, except that the disk, instead of being rotated intermittently, is rotated continuously, a pulley being attached to the spindle of the disk, around which a belt, I², passes, the latter passing over idle-pulleys I³ and around the hub of the cone C. The cut-off for discharging the buttons from the tube I, described in Patent No. 334,321, in which fingers are thrust laterally into and withdrawn from the tube, was objectionable from the fact that the fingers were likely to displace the button, sometimes causing the button-eyes to be partially or wholly withdrawn from the slots in the tube. I have therefore devised the following: Pointed pins $i$ and $i'$ are arranged to enter the button-tube through holes made in the top side thereof, and at sufficient distance apart to accommodate one button between the pins. The pin $i$ is attached to a flat spring, $i^2$, that in turn is secured at one end to the top of the button-tube. The free end of the spring is bent, substantially as shown, and made to hook over the wrist-pin $j'$ of the disk $j$. The tension of the spring presses the pin $i$ into the tube, and the movement of the wrist-pin $j'$ elevates this end of the spring and withdraws the pin $i$ sufficiently from the tube to allow a button to pass. The shank of the pin $i'$ is flattened and bent, substantially as shown, and connected with the wrist-pin $j^2$, located approximately on the opposite side of the axis of the disk from the wrist-pin $j'$. The spring $i^2$ is cut away on the side next the disk, to allow the pin $i'$ to pass. The disk $j$ is mounted on a rock-shaft, J, that is journaled in a suitable box connected with the depending arm L. The shaft J has attached a rock-arm, J', that with the up-stroke of the plunger is engaged by a shoulder, E², of the stock E', by which engagement the rock-arm is elevated, thereby drawing out the pin $i'$ and depressing the pin $i$. The shaft J has a spiral spring, J², mounted thereon and made to reverse the movement of the shaft, by means of which the movements of the pins $i$ and $i'$ are reversed. With this construction the buttons are discharged one at a time from the tube, and the pins $i$ and $i'$ entering from above have no tendency to displace a button, but, on the contrary, tend rather to press the button-eyes into the slot of the button-tube. The arm L is rigidly attached to the arm B³, and the upper end of the stock E' is secured in a suitable socket made in the lower end of the plunger E.

To the lower end of the stock is attached the head M and the clinching-die M', the latter being located in slots made in the bottom of the stock and head, and held in place by a slotted bolt, $e$, and a set-screw, $e'$, the latter engaging the heel of the die. The head M has a slot, $m$, in the lower face thereof, into which slot the swinging button-carrier arm N fits in bringing the button into position for the fastener to enter the eye thereof. The arm N is mounted on an upright spindle, N', the latter passing through a hole in one end of the head M.

The spindle is provided with a collar or enlarged part, $n$, spring $n'$, and pin $n^2$, the latter for engaging the incline L', made on the lower portion of the arm L, all of these parts being arranged and operated substantially as described in the aforesaid Letters Patent, No. 334,321, except certain improvements hereinafter described.

Heretofore the carrier-arm N was forced down out of the socket $m$ by the engagement of the pin $n^2$ with the incline L' as the plunger moved upward. With such arrangement the tendency was not only to press the spindle downward, but to turn it laterally as well. The result was that the arm N was cramped in the slot $m$, and frequently the spindle N' was bent by such usage.

As an improvement, I make the stock E' thicker on the side next the spindle, and make a semicircular vertical groove, E³, in the face of the stock, into which groove the collar $n$ fits and may turn and slide endwise, by means of which the spindle is supported, and is not easily bent. Next I make a flat surface, $l$, on the lower end of the arm L at the termination of the incline. This flat surface engages the pin $m^2$ in depressing the spindle. Next I attach a plate, $e^2$, to the side of the stock, the said plate having a slight incline, $e^3$. I also secure a short pin, $n^3$, to the collar $n$, the two pins extending at about right angles from each other. Now, with the upward movement of the plunger the pin $n^2$ engages the flat surface $l$, and the spindle is depressed without cramping the arm N in the slot $m$, and just as the arm N is disengaged from the said slot the pin $n^3$ engages the incline $e^3$, by which engagement the spindle is turned far enough to carry the pin $n^2$ off of the flattened surface $l$ and onto the incline L', by which latter engagement the spindle is further turned, bringing the arm N under the mouth of the button conduit or tube. With this arrangement of parts the different members operate easily and with little friction and wear. Another important feature is the stop $l^2$.

With the machine heretofore in use the arm N reached its position under the button-tube at the end of the upstroke of the plungers, and there was not time enough given for the button to find its proper position in its seat on the arm before the downstroke commenced, the result of which was many buttons were thrown off of the arm, or were misplaced, and consequently not fastened to the fabric. By means of the stop aforesaid, and by locating the mouth of the button-tube slightly lower down, the arm N reaches the position for receiving the button a little before the terminus of the upstroke, and as such position of the arm is reached the collar $n$ strikes the stop $l^2$, causing the arm to remain at rest while the reciprocating parts pass the upper dead-center. Of course the spring $n'$ is compressed endwise thereby, and when, with the downward movement of the plunger the collar would naturally be carried away from the stop, the spring raises the spindle and retains the collar against the stop for a moment longer, thus giving ample time for the button to roll, tumble, slide, nestle, and fix itself properly in its seat in the carrying-arm before the downstroke of the arm commences, and the result is that the buttons are about sure to be properly fastened to the fabric.

The operation is as follows: The parts of the button-feeder, pin and washer feeder, and revolving turret-plate, that carries the pins and washers in their placed position seated ready for clinching, together with the clinching device, having been already described, I will now give a general description of the machine as it operates to produce a complete result periodically, and the relative movements, with their time of action conjunctively, that are necessary to effect this result.

I will first review the general features and operation of the button-fastener.

Motion being communicated through the belt $a^2$ to the crank disk $c$ and pitman $c'$, the pitman gives to the plunger D a vertical reciprocatory motion that is limited by the length of crank $c$. The plunger E being connected to the plunger D by the yoke D', their movement is alike. The button-hopper I, being supported in an inclined position, is revolved on a center support or spindle by a belt, $I^2$, that communicates motion. This may be discontinued at will by means of a treadle. The hopper I has a concentric shallow groove in its bottom, that is located near its cylindrical wall. The slow rotation of the hopper causes the buttons to arrange in a row, with their eye-shanks in the groove. At a proper point, $I^{3*}$, the wall of the hopper I is perforated to accommodate the feed-tube I', and the buttons are fed through a throat-plate that is located in the orifice $I^{3*}$ into the feed-tube I'. This tube is given a downward and lateral bend, so as to bring its end $I^4$ at a proper point to discharge the buttons into the button-carrier N. The periodical discharge of the buttons, one at a time, is effected by the action of the crank-disk $j$. This disk has a shaft, J, that is supported rotatively on the side of the depending bracket-arm L. (See Figs. 22 and 23.) It has a spiral spring, $g^3$, upon its body that in normal position holds the arm J' down when it is free of the shoulder $g^2$ on the stock E'. (See Fig. 22.) When the rock-arm J' is depressed by the spring $g^3$, the crank-disk J assumes the position relatively that is shown in Fig. 22, and the bent pin $i'$ is projected into the bottom of the tube I', to prevent the escape of a button. At the same time the rear adjustable pin, $i$, is withdrawn sufficiently to permit a second button to assume proper position for its discharge at the return-stroke of the plunger E. It should be stated that the position of the rock-arm J' and the connected button-discharging mechanism, as above described, is assumed when the crank of the machine is on a downward stroke, and the abutment-shoulder $g^2$ is thus carried away from the vibrating lever $g'$. A reversed position of the button-feeding device is shown in Fig. 23. The plunger E is here shown at the extremity or dead-point of its upward stroke. The mechanism here has withdrawn the forward bent pin $i'$, and, as shown, the button is discharged into the carrier N, that has assumed its proper relative position below the discharge end $I^4$ of the tube I'. The button-carrier N is held normally by its upwardly-projecting shaft N, and the spiral spring $n'$, that encircles this shaft, in a latched position below the die-head M, being engaged in an open slot or recess, $m$, made for its retention in place on the lower face of this die-head, is now near the lower end of its descending movement with a button in place to be clinched. The button-carrier N is brought into proper relative position to receive its button thus. When the plunger E commences to move upward, after a button has been attached to its place on a shoe, the abutment-pin $n^2$ strikes the shoulder or square lower end of the depending cam-bracket L. This will compress the spring $n'$ and carry the shaft N' and its carrier-arm N out of the notch $m$ in the lower face of the die-head M. This compression of the spring $n'$ will also depress the abutment-pin $n^3$, so that it will impinge on the inclined edge of the plate $e^2$ on the stock E'. This engagement will cause the partial revolution of the shaft N', so that the abutment-pin $n^2$ will be moved off of its bearing on the square end of bracket L, and in its turn be brought in contact with the spirally-upward twisting edge of the curved lower end of this vertical plate L. The manifest result of this contact of parts will be to further revolve the shaft N' and its attached button-carrier plate N, so that the plate N will extend outward at a right angle to the front face of the die-head M. While this action is being performed the upward motion of the plunger E will carry the piece N into its proper place beneath the end $I^4$ of the feed-tube I' to receive a button. As has been previously stated, the upper end of the boss N engages the set-screw $l^2$ (see Fig. 23) when the button-carrier is in position below the discharge-tube $I^4$. This abutment takes place just before the dead-point of extreme of stroke of the pitman $c'$ and its driving-crank $c$ is reached. This engagement will cause the spiral spring $n'$ to absorb the continual upward movement of the die-head M, while the carrier N remains fixed to receive the button as it is released from the tube I'. This provision is made to give the necessary time the button expends in passing from the point of release above the bend $M^3$ in the feed-tube I'. The pin and washer feeding is timed with the button-feeding, so that a pin and washer will be in proper position on the upper face of the supporting-sleeve $f^2$, that is located in the supporting-turrets $f$, one of these turrets being located below the die-head M, when the downstroke of the plunger E brings this die with a properly-held button in place to receive the inserted pin that first passes through the leather or other fabric of a shoe-upper, and then enters the button-shank, to be formed into a rounded eye, this operation being technically termed "clinching" the washer and button on a shoe. The pins are first inserted into the washers and these joined pieces are placed consecutively in a slotted tube, H. (See Fig. 21.) This tube, as will be noticed, is given an inclined position in the shoe $H^2$, the slot being below, and the pins $H^6$ in regular order slide by gravity to the receiving feed-disks $h$. These disks $h$, by their combined action on the edges of the washers, periodically feed a pin and washer into the pendent tube $H^4$, that hangs immediately below them. The weight of the washer is enough to reverse the position of these two parts, and in consequence the washer is deposited on the face of the carrying-sleeve $f^2$, with the head of the pin below resting on the anvil-head $f'$. The turrets $f$ are upwardly-projecting tubes that are rigidly affixed in the rotatively-moving turret-plate F. These turrets $f$ are so located on the plate that they can successively be brought beneath the feed-tube $H^4$. They are evenly spaced apart. The number preferably employed is five. A larger number will require an objectionable increase in the diametrical size of the turret-plate F. Another cause for this preferred number of the turrets $f$ is that it permits a locked turret to be in place below the pin and washer feeding tube $H^4$, to receive one of these in place, while the odd turret is directly in front and in lined position locked to clinch its contained pin and washer with a button upon a shoe-upper. The cam-grooves made in the sleeve $D^2$ are so proportioned in their inclination or pitch as to cause the plate F to make a proper rotative movement to the right when the plunger D is on the upstroke. This partial rotation is just sufficient to cause a turret to be advanced away from the tube $H^4$ and another turret to take its place below this tube $H^4$. The ratchet-washer $d$, that meshes into the teeth cut on top edge of the sleeve $D^2$, being held from rotation, has limited vertical play, and is made to bear forcibly upon the serrated edge of the cam-grooved tube $D^2$ by the action of the spring $d'$. The teeth on the tube $D^2$ mesh with the ratchet-teeth on the washer $d$ when the depression of the tube $D^2$ reaches a point where the straight continuations of the cam-grooves at its lower end are in connection with the engaging-pins on the turret-plate F. This engagement, as is evident, will hold the sleeve $D^2$ and the plunger D in secured adjustment, and so cause the cam-grooves in the surface of the sleeve to act on the abutment-pins $d^2$, that are fixed in the interior surface of the turret-plate F, and force this plate to be advanced the throw of the cams, or a distance from the center of one turret to the center of the next following turret, so as to bring the latter-named turret into the place vacated by the preceding one. When the plunger D is given a reverse movement and the cam-grooves in the surface of the sleeve $D^2$ engage with the shoulder-pins $d^2$, the sleeve will be caused to make a fifth of a revolution, slipping on the ratchet-teeth of washer $d$, and this point will be reached when the plunger D has been so depressed as to bring the tops of the inclined cam-grooves in the sleeve $D^2$ at a point where they are continued as vertical grooves a short distance farther. When this point is reached, the ratchet-teeth on the superimposed washer $d$ and those on the sleeve $D^2$ will again engage, and so lock the sleeve to the plunger for a return-stroke and another advance of the turrets $f$. The unlocking of the dowel-pin or dog G from the holes $f^3$ in the under side of the plate F is accomplished at a point when the crank-center below is turned and an upstroke of the plunger D is started. This permits the progressive action of the turrets when the cam-groove is brought to bear on the shoulder-pins $d^2$ in plate F, and it is for the purpose of permitting time to effect the unlocking movement that the upper continuations of the cam-grooves are made perpendicular. When the operation of feeding the pins and washers has been continued long enough to bring a charged turret under the die-head M, the lower face of the anvil-rod $f'$ will bear on the unyielding surface of the plate $b$, and so support the superimposed head of the vertical pin that, with its washer, is in position for clinching through a button-eye that lies just above it. The turret is brought into position and locked below and in line vertically with the clinching-die M' when the plunger E is near the upper end of its rising movement. This permits sufficient time to place the shoe-upper in position to receive a button before the downstroke is made. When the die-head M and its attached button-carrier N is depressed so that the button in the orifice in the latch N is brought into contact with the shoe-upper, the crank $c$ is still about one-eighth above the lower dead-center, and the spring-tube $f^2$ of the turret $f$ will yield, under the continued downward motion of the die-head M, until the shank of the vertically-held pin is inserted through the leather of the shoe-upper. Then its end coming into contact with the semicircular surface of the die M', it will be curved around the shank of the shoe button, through which it has been passed in its upward passage, and by the joint action of the die M' and the anvil $f'$ the operation will be completed, and result in the formation of a complete eye that is partly embedded in the upper surface of the shoe, the washer and pin-head below being a smooth level finish, the edge of the washer being slightly sunken into the shoe-lining, so that its edge will not catch the stocking of the wearer of a shoe it is affixed upon. The relative position of the anvil in the turret $f$ and the die M' can be adjusted by an alteration of the set-screw $b^4$, as its abutment upon the plate A' will elevate the front edge of the turret-plate F sufficiently to alter the clinching action of the anvil and die, and thus permit buttons to be attached to thick or thin work equally well.

The operation, it is evident, may be automatically continued at pleasure. The machine works perfectly in all of its parts, and buttons can be attached as fast as the operator can place the shoe or other article in position to receive them.

What I claim is—

1. In an automatic button-setting machine, the combination, with mechanism for discharging buttons and fasteners and a clinching device, substantially as described, of an intermittently-rotating disk having attached a series of hollow plugs, and co-operating mechanism for successively carrying the fasteners to the clinching device, and suitable mechanism for rotating the disk, the parts being arranged substantially as described.

2. The combination, with a rotating disk having attached a series of hollow plugs, and connected mechanism for holding fasteners, substantially as described, of a sleeve journaled on a vertically-reciprocating plunger, said sleeve operating through a central bore of the disk and having one or more spiral grooves, the disk having pins for engaging said grooves, a ratchet on the sleeve, and a retaining ratchet-collar engaging the same, the parts being arranged substantially as set forth.

3. The combination, with a disk and mechanism, substantially as described, for intermittently revolving the disk, of a locking device for the disk, the same consisting, essentially, of a series of holes in the disk, a spring-actuated dog adapted to enter said holes, and a lever and suitable connecting mechanism, as shown, for withdrawing the dog automatically by the movement of the plunger, substantially as set forth.

4. The combination, with an intermittently-revolving disk, plunger, and sleeve for operating the same, a locking device for the disk, and a lever for withdrawing the locking-dog, of a rod connected with the said lever, and a tilting toe pivoted to the rod, the latter having projections for engaging projections on the plunger, substantially as set forth.

5. The combination, with a disk, a vertically-reciprocating plunger, attachments for rotating the disk intermittently, and a locking device for the disk, the parts being arranged substantially as indicated, of a rod for actuating the locking mechanism, said rod having a tilting toe pivoted thereto, the latter having projecting parts for engaging corresponding projections on the plunger, said rod being inclined to the line of the plunger, substantially as set forth.

6. The combination, with a turret-disk, a vertically-reciprocating plunger, a rod inclined to the line of the plunger and connected with the locking device, of a tilting toe pivoted to the rod, a spring for distending the toe from the rod, an abutment-screw for limiting such distention, and projections on the toe and the plunger for mutually engaging each other, the parts being arranged substantially as set forth.

7. The combination, with a turret-disk, a vertically-reciprocating plunger, and laterally-projecting pins connected therewith, of a rod for operating the locking device, said rod being inclined to the axis of the plunger, a bifurcated tilting toe pivoted to the rod, said toe having inwardly-projecting pins for engaging the pin of the plunger, a spring for holding the toe distended from the rod, and an abutment-screw for limiting such distention, substantially as set forth.

8. The combination, with fluted feed-rolls set in pairs, the opposing flutings of which are made successively to embrace the fasteners as the rolls are turned, of engaging twin gears mounted, respectively, on the spindles of the feed-rolls, and a ratchet and a pawl for operating the same, the pawl-lever being operated by an arm connecting with the plunger of the machine, substantially as set forth.

9. The combination, with an inclined button-tube, of a rocking disk, a spring adapted to move in one direction by engagement with a projection on the rocking disk and carrying a pin, and a second pin or stop secured to said disk, the parts being arranged substantially as described, whereby the pins alternately and in reverse order enter and withdraw from the tube, substantially as and for the purpose described.

10. The combination, with a reciprocating stock with button-setting head and clinching-die attached, and a swinging button-carrier arm mounted on a vertical spindle, the latter being journaled in the said head, said spindle being provided with a collar or enlarged part and spring, substantially as indicated, of a groove made in the side of the stock for supporting the said spindle, the collar or enlarged part of the latter being adapted to move in said slot, substantially as set forth.

11. The combination, with a stock, head, carrier-arm, and spindle, substantially as indicated, of pins projecting laterally from the spindle, cams made to engage alternately the respective pins, and a flat surface at the end of one cam for depressing the spindle by engaging a pin of the same, substantially as set forth.

12. The combination, with a reciprocating stock, a button-setting head connected with the stock, a button-carrier arm and spindle, and cams for operating the spindle, and a spring for rotating the spindle in one direction and holding the same elevated, the parts being arranged substantially as indicated, of a stop connected with the stationary part of the machine, said stop being made to engage the spindle on the upstroke of the machine to limit the upward movement of the spindle and hold the same stationary while the reciprocating parts are passing the upper dead-center, substantially as set forth.

In testimony whereof I sign this specification, in the presence of two witnesses, this 12th day of July, 1886.

JAMES B. MILLER.

Witnesses:
CHAS. H. DORER,
ALBERT E. LYNCH.